United States Patent [19]

Gallo

[11] 4,455,784
[45] Jun. 26, 1984

[54] STEM CLEANER

[76] Inventor: Joseph S. Gallo, 58 Peach St., Walpole, Mass. 02081

[21] Appl. No.: 371,176

[22] Filed: Apr. 23, 1982

[51] Int. Cl.³ .............................................. A01G 3/01
[52] U.S. Cl. ...................................... 47/1 R; 30/304; 47/58
[58] Field of Search ................. 47/1, 6, 7, 58; 30/287, 30/294, 299, 304, 305

[56] References Cited

U.S. PATENT DOCUMENTS

| 64,823 | 3/1867 | Worsham | 47/1 |
| 1,628,087 | 5/1927 | Warren | 30/287 |
| 2,051,680 | 8/1936 | Collens | 30/304 |
| 2,167,337 | 7/1939 | De Meester | 47/1 |
| 3,270,368 | 9/1966 | Cook et al. | 30/304 X |
| 4,012,060 | 3/1977 | Apodaca | 294/33 |

Primary Examiner—James R. Feyrer

[57] ABSTRACT

A stem cleaner for cutting away thorns, excess foliage and the like from stems having a flexible handle with two free ends to which are attached at least one cutting blade capable of being pressed against a stem. The cutting blade is shaped so as to prevent damage to the outer stem bark: the stem-contact surface is wide along the stem length direction; oblique-angle transitions are provided between that surface and surfaces sloping away from the stem-contact surface; and a sharpened cutting edge for cutting away the thorns and foliage is spaced outwardly from the stem-contact surface to prevent its contact with the stem bark.

14 Claims, 3 Drawing Figures

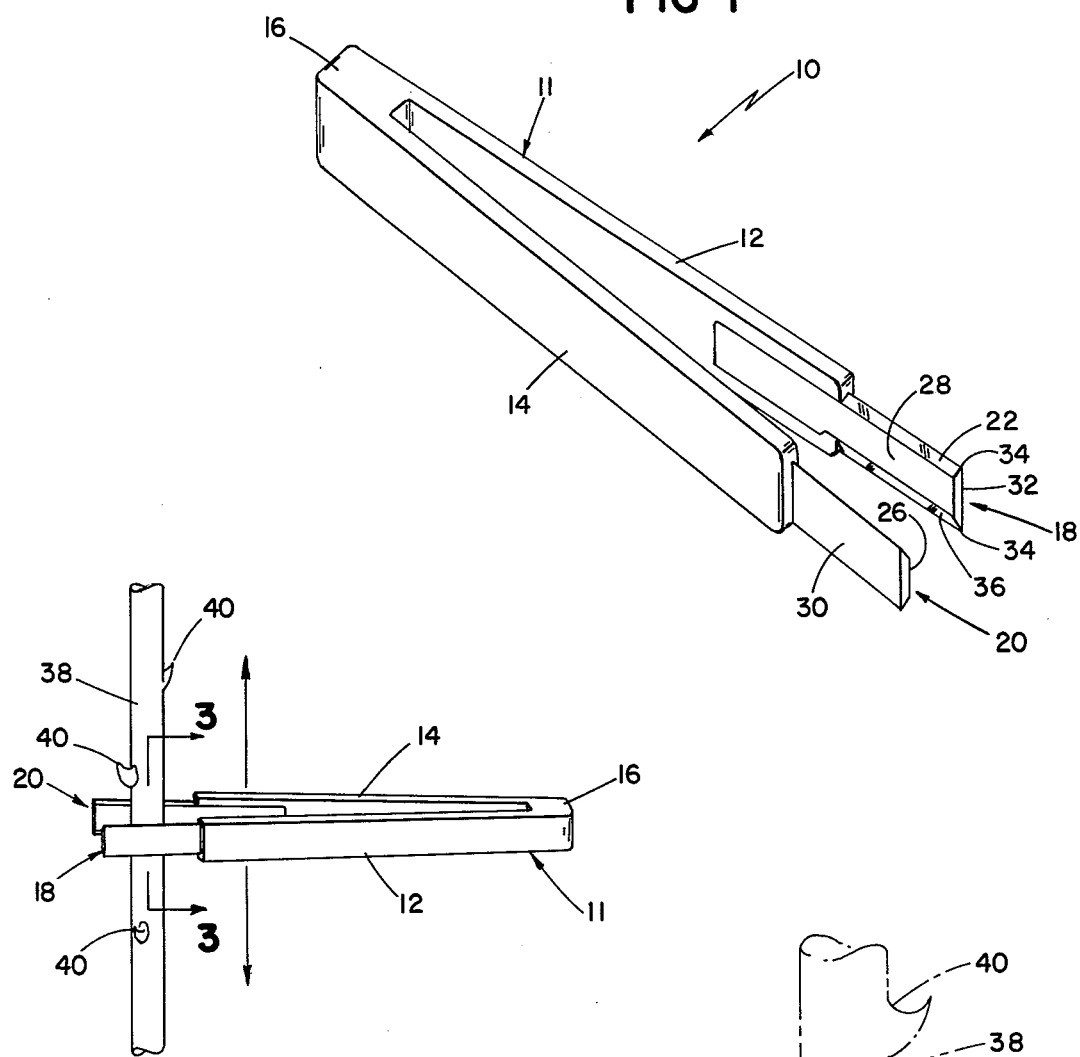
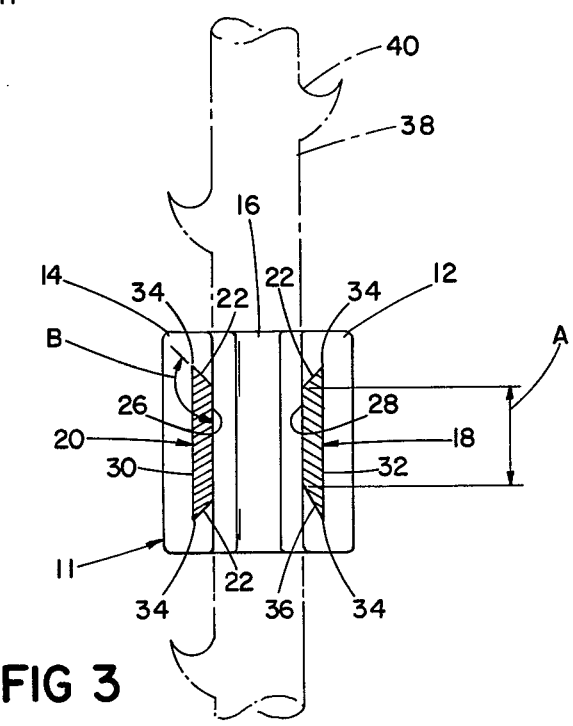

STEM CLEANER

BACKGROUND OF THE INVENTION

This invention relates to stem cleaners for removing thorns and excess foilage from flower stems.

SUMMARY OF THE INVENTION

In general, the invention features a stem cleaner having a flexible handle with two free ends to which are attached at least one cutting blade capable of being pressed against a stem. The cutting blade is shaped so as to prevent damage to the outer stem bark: the stem-contact surface is wide along the stem length direction; the transitions provided between that surface and surfaces sloping away from the stem-contact surface are adapted to prevent such damage (e.g., by providing an oblique angle between the surfaces); and a sharpened cutting edge for cutting away the thorns and foliage is spaced outwardly from the stem-contact surface to prevent its contact with the stem bark.

In preferred embodiments, there are two cutting blades, one at each free end; the blades have trapezoidal cross sections; the flexible handle comprises two members attached to each other at one end; each of the cutting blades has two edges generally parallel to the longitudinal axis of the stem cleaner; the sharpened edges are formed at the acute-angle intersections of inclined surfaces; one of the edges is made into a knife, for cutting stems, by forming a more acute angle at the surface intersections; the handle is plastic to which is affixed separately formed metal cutting blades; the stem-wise width of the cutting blade is greater than 0.2 inches; the transitions between the stem-contact surface and adjoining surfaces is an oblique angle (preferably greater than 100°).

The stem cleaner can be positioned around the flower stem and moved up and down to remove thorns and unwanted foliage without stripping of the surface bark from the stem, because the stem-contacting surfaces of the blades are wide enough to prevent such stripping, because transitions between the stem-contacting surface and the remaining surfaces of the blade include no sharp corners, and because the sharpened cutting surfaces that cut off the thorns and unwanted foliage are spaced from the inner face of the cutting blade so the cutting surface never comes in contact with the stem surface.

Other features and advantages of the invention will be apparent from the description of the preferred embodiment, thereof, and from the claims.

DESCRIPTION OF THE PREFERRED EMBODIMENT

We turn now to the structure and operation of the preferred embodiment, first briefly describing the drawings thereof.

FIG. 1 is a perspective view of the stem cleaner.

FIG. 2 is a perspective view of the cutting blades of the stem cleaner.

FIG. 3 is a sectional view taken along 3—3 of FIG. 2.

Referring to the drawings, stem cleaner 10 has flexible handle 11 with free ends 12, 14 joined at bas 16 (all one molded plastic piece).

Metal cutting blades 18,20 are each attached to one of the free ends. The cutting blades have smooth, stem-contacting surfaces 26, 28, surfaces 22, 36 sloping away from the stem-contacting surfaces, and outer surfaces 30, 32. The acute-angle intersections of outer surfaces 30, 32 and sloping surfaces 22, 36 form cutting edges 34.

The stem cleaner is positioned around flower stem 38, the handles are pressed together so that the inner faces of the cutting blades contact the stem, and the cleaner is then slid along the length of the stem such that the sharpened cutting edges 34 remove thorns 40 and excess foilage without coming in contact with the surface of the stem.

The stem-wise width A of stem-contact surfaces 26, 28 is about 0.75 inches, which is sufficiently large to prevent an excessive squeezing of the blades from putting so much pressure on the stem as to damage it or strip away its bark. Also, the oblique angle B (about 135° and preferably greater than 100°) between the stem-contact surface and sloping surfaces 22 works to prevent bark from being stripped away or other damage to the stem.

The sharpened cutting edge created by more gradually sloping surface 36 can be used as a knife to cut stems.

Other embodiments are within the following claims. E.g., the cleaner is still effective in removing thorns and excess foliage, without damaging the outer bark of the stem, if the stem-contact width A is as little as 0.2 inch and if a different-shaped transition is provided between the stem-contacting surfaces 26, 28 and the sloping-way surfaces 22 (e.g., instead of two flat surfaces 26, 22 joined at oblique angle B, a single curved surface could be provided).

What is claimed is:

1. A stem cleaner for cleaning thorns and excess foliage and the like from stems, comprising:

two yieldable arms joined at one end by a handle connection portion and each having a free end extending generally along a longitudinal axis of each arm, said yieldable arms allowing the free ends of said arms to be biased toward one another when said arms are grasped by hand between said connection portion and said free ends, and a cutting blade extending from at least one said free end, said arms allowing said free ends to be pressed toward each other for bringing said blade in contact with a stem, each said cutting blade comprising a first surface providing a gauging surface for sliding movement over the bark of said stem, a pair of second surfaces adjoining said first surface at each stem-wise end of said first surface, said second surfaces sloping away from said first surface so as to remain out of contact with the stem, the transition between said first and second surfaces being adapted to prevent bark from being stripped away from the stem and other damage to the stem, at least one sharpened cutting edge extending generally parallel to said longitudinal axis for cutting away thorns, excess foliage and the like from the stem, said cutting edge being spaced outwardly from said first surface, to prevent said edge from contacting said stem and thus from stripping away bark therefrom and from otherwise damaging the stem.

2. The stem cleaner of claim 1 wherein said stem-wise width of said cutting blade is greater than 0.2 inch.

3. The stem cleaner of claim 1 wherein at said transitions there is an oblique angle between said first and second surfaces and said angle is greater than 90°.

4. The stem cleaner of claim 3 wherein said angle is greater than 100°.

5. The stem cleaner of claim 1 wherein there is a said cutting blade extending from both of said free ends.

6. The stem cleaner of claim 5 wherein each of said edges is formed at the intersection of said second surfaces and an outer surface generally parallel to said first surface.

7. The stem cleaner of claim 6 wherein said blades have a generally trapezoidal cross section along a section taken generally perpendicular to said longitudinal axis and parallel to the long dimension of the stem, said first, stem-contacting surface is formed by the shorter parallel side of the trapezoid, said second, sloping-away surfaces are formed by the non-parallel sides of said trapezoid, said transitions are formed by the greater-than-90° angles between said shorter parallel and non-parallel sides, and said sharpened cutting edge is formed at the interesection between the longer parallel side and said non-parallel sides.

8. The stem cleaner of claim 7, wherein said flexible handle comprises two members, each having one said free end, and each attached to the other at their other ends.

9. The stem cleaner of claim 8 wherein each of said cutting edges are generally parallel to said longitudinal axis.

10. The stem cleaner of claim 9 wherein the angle between said outer and second surfaces is smaller at one edge, to thereby form a knife edge for cutting stems.

11. The stem cleaner of claim 10 wherein said flexible handle is of plastic material.

12. The stem cleaner of claim 11 wherein said cutting blades are metal.

13. The stem cleaner of claim 1 wherein said cutting blade is affixed to said handle, which is formed separately from said blade.

14. The method of removing thorns, excess foliage and the like from stems, comprising the steps of inserting a stem between the cutting blade and opposing free end of a stem cleaner, said stem cleaner comprising a stem cleaner for cleaning thorns and excess foliage and the like from stems, comprising:

two yieldable arms joined at one end by a handle connection portion and each having a free end extending generally along a longitudinal axis of each arm, said yieldable arms allowing the free ends of said arms to be biased toward one another when said arms are grasped by hand between said connection portion and said free ends, and a cutting blade extending from at least one said free end, said arms allowing said free ends to be pressed toward each other for bringing said blade in contact with a stem, each said cutting blade comprising a first surface providing a gauging surface for sliding movement over the bark of said stem, a pair of second surfaces adjoining said first surface at each stem-wise end of said first surface, said second surfaces sloping away from said first surface so as to remain out of contact with the stem, the transition between said first and second surfaces being adapted to prevent bark from being stripped away from the stem and other damage to the stem, at least one sharpened cutting edge extending generally parallel to said longitudinal axis for cutting away thorns, excess foliage and the like from the stem, said cutting edge being spaced outwardly from said first surface, to prevent said edge from contacting said stem and thus from stripping away bark therefrom and from otherwise damaging the stem, squeezing said free ends of said stem cleaner together so as to bring said first surface of said blade into contact with said stem, and translating said stem cleaner along the length of said stem, thereby bringing said cutting edges into contact with, and removing, the thorns, excess foliage and the like.

* * * * *